(12) United States Patent
Wolters

(10) Patent No.: US 6,602,131 B2
(45) Date of Patent: Aug. 5, 2003

(54) MULTI-TIER CROP RESIDUE FLOW GUIDE FOR AN AGRICULTURAL COMBINE

(75) Inventor: Joshua J. Wolters, Geneseo, IL (US)

(73) Assignee: Case Corporation, Racine, WI (US)

( * ) Notice: Subject to any disclaimer, the term of this patent is extended or adjusted under 35 U.S.C. 154(b) by 70 days.

(21) Appl. No.: 10/015,356

(22) Filed: Dec. 12, 2001

(65) Prior Publication Data

US 2003/0109293 A1 Jun. 12, 2003

(51) Int. Cl.⁷ .............................................. A01F 12/00
(52) U.S. Cl. ..................................... 460/111; 460/901
(58) Field of Search ................................ 460/111, 112, 460/113, 119, 901; 56/320.1; 239/667

(56) References Cited

U.S. PATENT DOCUMENTS

| | | | |
|---|---|---|---|
| 1,695,532 A | 12/1928 | Cady | |
| 2,626,159 A | 1/1953 | Thompson ...................... 275/3 |
| 3,186,460 A | 6/1965 | Frederick ...................... 146/117 |
| 3,232,627 A | 2/1966 | Larson .......................... 275/15 |
| 4,526,180 A | 7/1985 | Scott et al. ................ 130/27 R |
| 4,591,102 A | 5/1986 | Clarke .......................... 239/655 |
| 4,735,216 A | 4/1988 | Scott et al. ................ 130/27 R |
| 4,892,504 A | 1/1990 | Scott et al. .................. 460/112 |
| 5,021,030 A | 6/1991 | Halford et al. ............. 460/111 |
| 5,215,500 A * | 6/1993 | Kirby .......................... 460/111 |
| 5,556,042 A * | 9/1996 | Roberg .................. 241/101.76 |
| 5,775,991 A | 7/1998 | Underwood et al. ........ 460/111 |
| 6,079,643 A * | 6/2000 | Hoyle .......................... 239/681 |
| 6,113,491 A | 9/2000 | Holmén ...................... 460/111 |
| 6,238,286 B1 | 5/2001 | Aubry et al. ............... 460/111 |
| 6,241,605 B1 | 6/2001 | Pfeiffer et al. ................ 460/69 |
| 6,416,405 B1 * | 7/2002 | Niermann .................... 460/79 |

FOREIGN PATENT DOCUMENTS

| EP | 0212337 | 3/1987 |
|---|---|---|
| EP | 1078566 | 8/2000 |

* cited by examiner

Primary Examiner—Thomas B. Will
Assistant Examiner—Meredith Petravick
(74) Attorney, Agent, or Firm—John William Stader; Rebecca L. Henkel

(57) ABSTRACT

A mult-tier crop residue flow guide for a rotary crop residue spreader of an agricultural combine including an element disposed in a housing and rotatable in a predetermined direction about an axis which is oriented horizontally or at a small acute angle to horizontal for driving a flow of crop residue through a discharge opening of the housing located at a predetermined angular position around the axis, the flow guide including at least two guide surfaces or tiers having inlet ends disposed in at least generally axially side by side relation adjacent to the discharge opening in position for directing portions of the flow of crop residue in generally the predetermined direction radially outwardly.

12 Claims, 3 Drawing Sheets

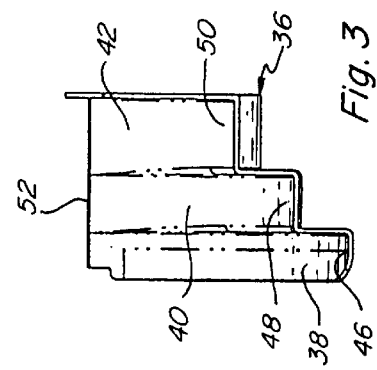
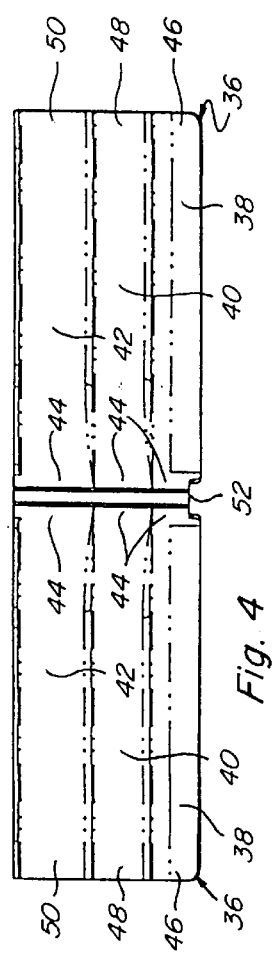
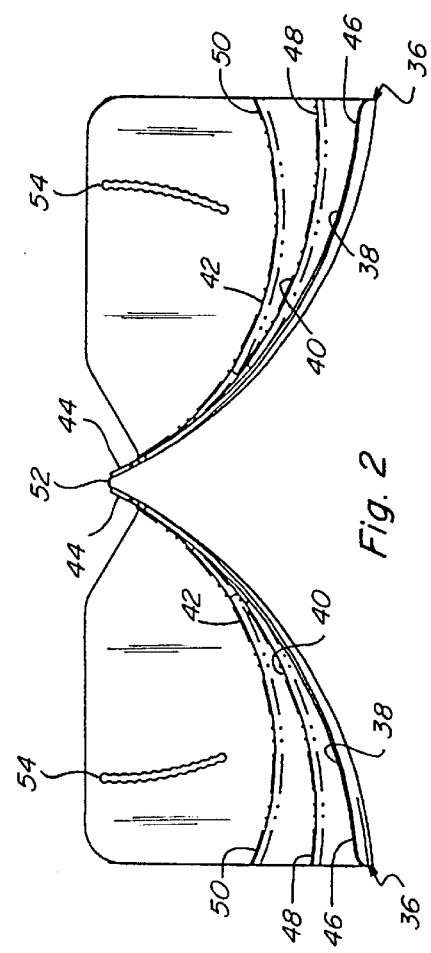

MULTI-TIER CROP RESIDUE FLOW GUIDE FOR AN AGRICULTURAL COMBINE

TECHNICAL FIELD

This invention relates generally to agricultural combines, and more particularly, to a multi-tier or surface crop residue flow guide for the discharge outlet of a vertical crop residue spreader and/or chopper, the tiers or surfaces of which direct or guide portions of a discharged flow of crop residue along vertically different outwardly directed flow paths so as to be better and more evenly distributed over a larger region of an agricultural field from which the crop was harvested.

BACKGROUND ART

Currently, combines typically include a straw chopper and/or straw spreader for disposing of straw and other residue separated from the harvested crop onto the crop field. In addition, some combines have a chaff spreader for spreading chaff residue separated from the grain by the cleaning apparatus or system onto the crop field. In many instances it is desirable for the straw, chaff and other residue to be spread as evenly as possible over the width or swath of that section of the field over which the combine has just passed and harvested crop from, to avoid problems resulting from uneven spreading, such as, but not limited to, difficulty in passage of fall tillage tools through residue clumps or thick areas; uneven insulation of the field resulting in uneven field warming and thawing and crop emergence during the following planting season; and increased rodent and insect habitat. In some instances, it is also desirable to have an ability to adjust the spreading to compensate for crop type, moisture and weather conditions, and the like, and also combine header width.

Although various crop residue spreaders are known which can propel residue a distance equal to about one half the width of a typical combine header, many suffer from shortcomings, including a tendency to propel heavier items of residue farther away while lighter items travel only a shorter distance. It is also known to provide deflectors and flow guides for crop residue spreaders having multiple flow channels, but the known flow channels are generally horizontally coplanar and arranged in sequential order along in the direction of rotation of the rotor or impeller of the spreader and/or chopper, which is also at least generally horizontal, and has been found to distribute and spread the residue more widely, but not as evenly as desired.

Thus, what is sought is a crop residue flow guide for the discharge outlet of a vertical rotary crop residue spreader and/or chopper, that is, one including an impeller or rotor rotatable about a generally horizontal rotational axis, having a capability to direct or guide portions of a discharged flow of crop residue outwardly along vertically different flow paths so as to be better and more evenly distributed over a larger region of an agricultural field from which the crop was harvested, to avoid shortcomings and problems of the prior art devices discussed above.

SUMMARY OF THE INVENTION

What is disclosed is a multi-tier or surface crop residue flow guide for a rotary crop residue spreader of an agricultural combine which overcomes many of the problems discussed above. The rotary spreader includes an element disposed in a housing and rotatable in a predetermined direction about an axis oriented horizontally or at a small acute angle to horizontal for driving a flow of crop residue through a discharge opening of the housing located at a predetermined angular position around the axis. The flow guide of the invention includes at least two vertically spaced guide surfaces or tiers having inlet ends disposed in at least generally axially side by side relation adjacent to the discharge opening in position for directing portions of the flow of crop residue in generally the predetermined direction radially away from the opening, respectively, each of the flow guides having a curved surface connected to the inlet end thereof and extending generally in the predetermined direction radially outwardly away from the discharge opening to a discharge end spaced radially outwardly from the spreader for directing the respective portion of the flow of the crop residue radially outwardly away from the spreader, the curved surfaces and discharge ends of the flow guides being radially or vertically offset or separated one relative to the other such that the portions of the flow of the crop residue will follow vertically different flow paths or trajectories away from the spreader.

According to a preferred aspect of the invention the flow guides can be mounted or connected to the spreader for pivotal or other movement upwardly and downwardly and possibly fore to aft to allow moving the flow guides through a range of positions for achieving a desired residue trajectory and distribution over a crop field. One or more deflector panels can also be disposed along the flow paths for further directing and controlling or damping the flow of crop residue.

BRIEF DESCRIPTION OF THE DRAWINGS

FIG. 2 is a rear elevational view of the flow guides of FIG. 1;

FIG. 3 is a side elevational view of the flow guides of FIG. 1;

FIG. 4 is a top view of the flow guides of FIG. 1;

DETAILED DESCRIPTION OF THE INVENTION

Figure 1:
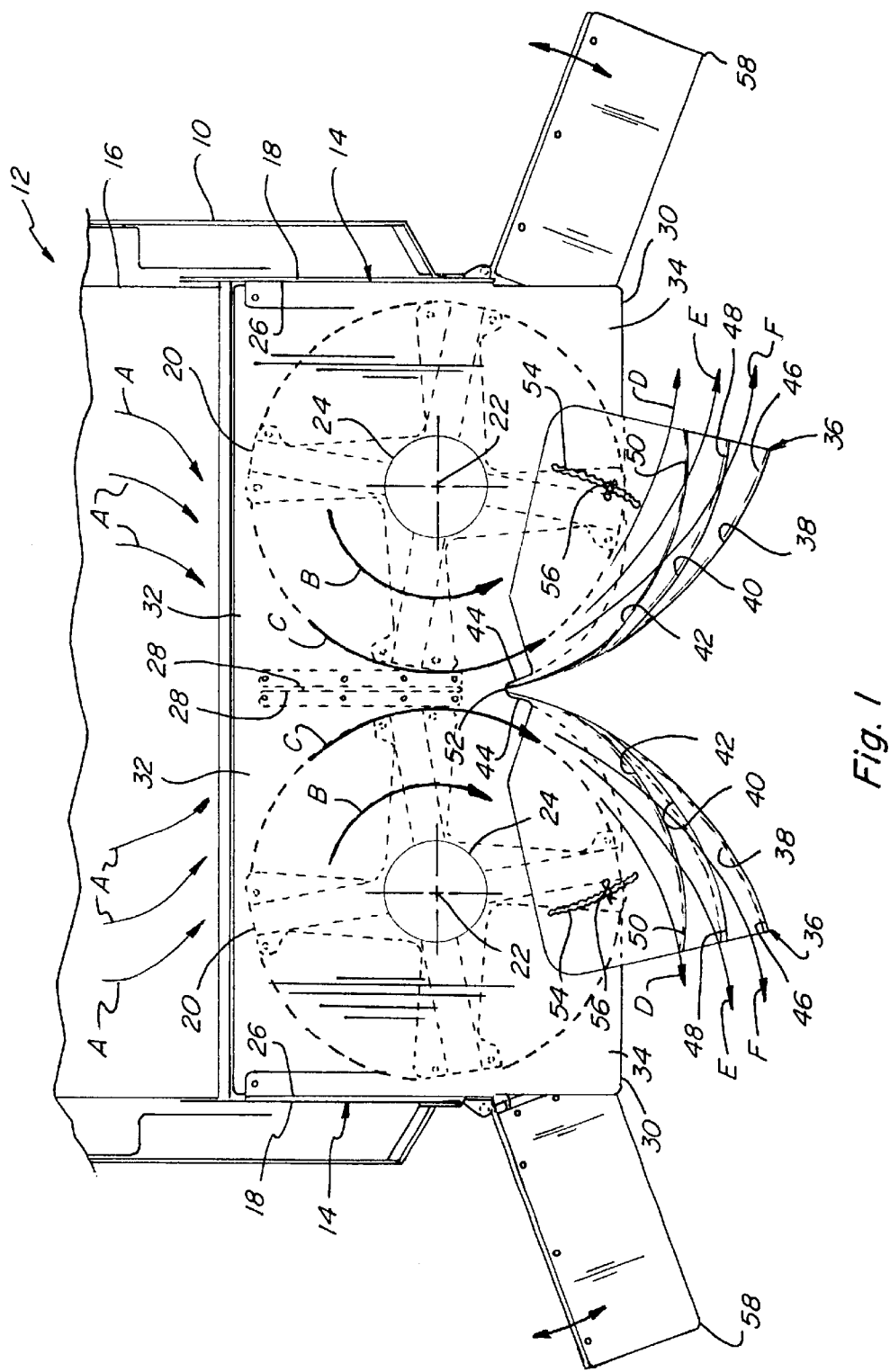
FIG. 1 is a simplified, fragmentary rear elevational view of an agricultural combine including a pair of multi-tier crop residue flow guides according to the present invention associated with a pair of crop residue spreaders of the combine.
Figure 5:
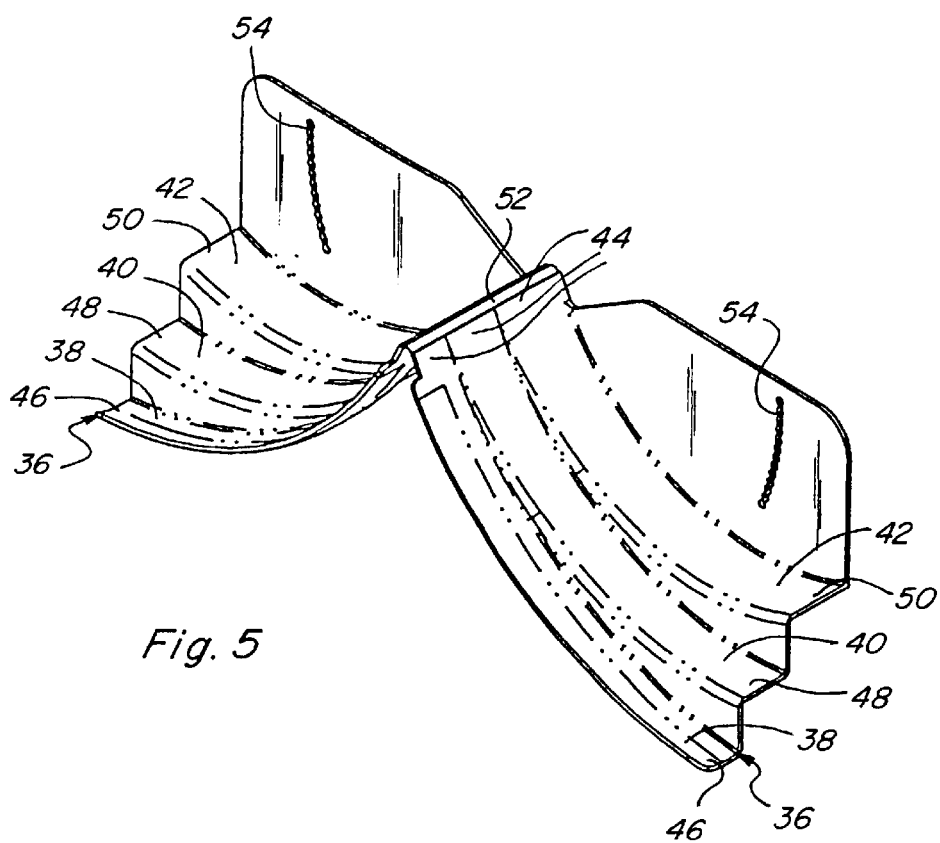
FIG. 5 is a perspective view of the flow guides of FIG. 1.

Referring now to the drawings, wherein preferred embodiments of the present invention are shown, in FIG. 1, a rear end 10 of a self-propelled agricultural combine 12 is shown, including a pair of rearwardly located rotary devices 14 representative of commonly used devices for chopping and/or spreading straw, stalks, and other crop residue and trash that has been separated from the grain of the crops by a threshing mechanism (not shown) of combine 12 located forwardly of rear end 10. The straw, stalks and the like are propelled rearwardly by rotating beaters or the like (also not shown) from the threshing mechanism and downwardly through an exhaust duct 16 as denoted by arrows A to vertical rotary devices 14 for chopping and/or spreading thereby.

Each rotary device 14 includes a housing 18 of sheet metal or other construction containing a spreader and/or chopper element 20 rotatable in a predetermined rotational direction, denoted by arrows B, about a rotational axis 22 by a suitable driving element, such as by a conventionally constructed and operable hydraulic motor 24 powered by pressurized hydraulic fluid received from a pump (not shown) of combine 12, an electric motor, belt, or the like. Rotational axis 22 of each device 14 is generally horizontal or oriented at only a small acute angle to horizontal. Housing 18 of each rotary device 14 includes spaced, opposed radial side walls 26 and 28, and a rear wall 30 extending therebetween, defining a cavity containing spreader and/or chopper element 20, as well as a forwardly and upwardly facing inlet opening 32 for receiving the residue flow denoted by arrows A, and a downwardly and radially facing discharge opening or outlet 34 through which the residue is propelled by spreader and/or chopper element 20. Residue flow within housing 18 is propelled by rotating spreader and/or chopper element 20 in the predetermined rotational direction B along a circumferential flow path, as generally represented by arrows C, at a speed which is equal to or increased relative to the inlet speed of the residue flow such that the residue does not build up at the inlet and is expelled from housing 18 through outlet 34 at a corresponding speed. In the instance wherein rotary device 14 is solely a spreader, the speed imparted to the residue by rotary device 14 will be sufficient for airborne travel of the residue a substantial distance from combine 12 for deposition on regions of the agricultural field over which combine 12 has just traveled and from which the crops have been harvested by combine 12.

As noted above, it is desired in many instances to distribute the crop residue discharged by rotary devices 14 substantially evenly over the width of a swath of the field from which the crop has just been harvested by combine 12, which width is typically defined by the overall width of a harvesting head of combine 12, which width can be as much as 30 to 40 feet in the instance of some heads currently in use. Thus, it is desirable that a rotary spreader and/or chopper, such as rotary device 14, have the capability to expel or propel crop residue a distance of up to about 20 feet or so therefrom, corresponding to one-half the width of the header used on combine 12, and possibly farther as combine headers of greater width are introduced. Spreader and/or chopper element 20 can be suitably configured and rotated at a sufficient velocity for propelling crop residue such as, but not limited to, chopped straw, stems and branches, cobs and the like, the required distance of up to one-half the width of a header currently being used, by a conventional hydraulic motor 24 shown or any other suitable driver. The problem to be currently overcome, however, is distributing the crop residue substantially evenly over this distance of up to about 20 feet or so.

Referring also to FIGS. 2, 3, 4 and 5, a multi-tier or surface crop residue flow guide 36 constructed and operable according to the teachings of the present invention is utilized in association with each of rotary devices 14. Each flow guide 36 includes a plurality of curbed or arcuate shape tiers or flow surfaces 38, 40 and 42 located in side-by-side relation with respect to the axial direction as defined by rotational axis 22. Each flow surface 38, 40, 42 includes an inlet end 44 which is located approximately in or adjacent to outlet 34 in a generally tangential relation to the rotary or circumferential residue flow within housing 18 as denoted by arrows B, flow surfaces 38, 40 and 42 connected with the respective inlet ends 44 and extending in the direction of rotation B progressively radially outwardly in diverging relation one relative to the other, terminating at respective discharge ends 46, 48 and 50 located in vertically or radially spaced relation one relative to the other. Flow surfaces 38, 40 and 42 importantly receive the residue flow simultaneously and will simultaneously carry respective portions of the residue flow radially outwardly therealong away from rotary device 14, as denoted by arrows D, E and F, the flow portions D, E and F also importantly diverging one relative to the other corresponding to the divergence of flow surfaces 38, 40 and 42 and the vertical or radial spacing of discharge ends 46, 48 and 50, so as to travel along different trajectories in essentially a fan pattern across a portion of the field over which the crop residue is to be distributed so as to be dispersed over and deposited on different, but possibly overlapping, regions of the field. In this regard, it should be noted that, as shown in FIG. 1, the flow portion represented by arrow F is slightly downwardly directed, the flow portion E is directed about horizontally, and the flow portion D is directed upwardly, which will provide a desired crop residue distribution for an exemplary application.

Typical combines, such as combine 12, generally can utilize more than one header for harvesting different types of crops, such as grasses such as wheat and the like, and alternatively, corn or the like, such that the residue spread by rotary devices 14 and flow guides 36 will have different flow characteristics. This can be due, for instance, to the different stalk and stem diameters and lengths of the different crops, pod sizes, cob sizes, and the like, and also moisture conditions. Additionally, different width heads may be used with a particular combine, and as a result it is often desired to alter the flow characteristics of the crop residue expelled from devices 14. Whether or not device 14 additionally chops the residue will also be a factor. To provide a capability for modifying flow direction, each flow guide 36 is preferably adjustable at least vertically or radially. To facilitate such adjustability, flow guides 36 are preferably pivotally or hingedly connected to housing 18 using a suitable hinge or the like, or one another, for instance by a preferred living hinge 52 or the like of a suitable plastics material. In this regard, flow guides 36 can be formed of a suitable conventional plastics material, such that living hinge 52 can be integrally formed therewith. Flow guides also preferably include a retaining element such as a preferred arcuate slot 54 which receives a pin 56 on housing 18 and includes serrations or detents for engaging pin 56 for holding the flow guide 36 in a desired position relative to pin 56, such that flow surfaces 38, 40 and 42 are maintained at a desired orientation or angle of inclination for a particular application or conditions.

Figure 6:
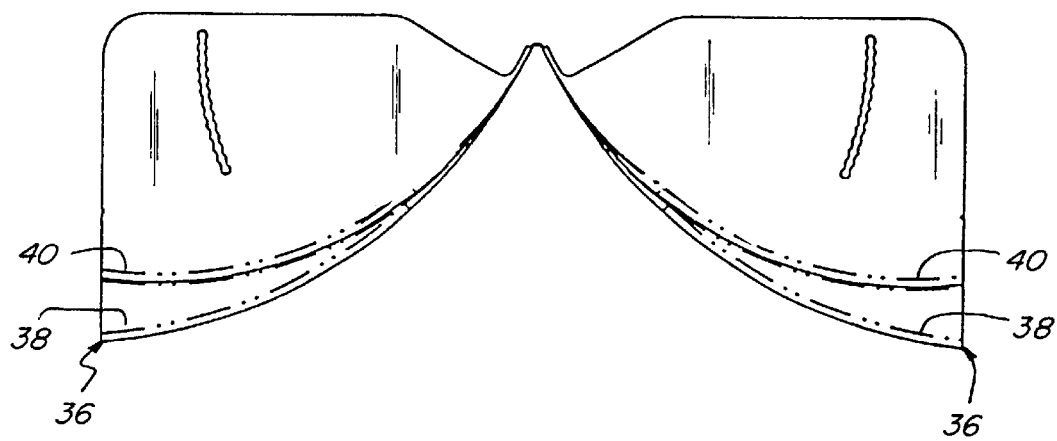
FIG. 6 is a rear view of an alternative pair of flow guides according to the present invention.

In FIG. 6, as an alternative construction, a pair of flow guides 36 are shown including only two tiers or flow surfaces 38 and 40 each, usable in the above described manner, to illustrate the possibility of using as few as two or as many as about ten vertically or radially spaced and diverging flow surfaces according to the invention.

Referring again to FIG. 1, optional adjustable deflectors 58 are shown attached to housing 18 downstream along the paths or trajectories of flow portions D, E and F from flow guides 36, respectively. Deflectors 58 can by moved at least in the directions shown by the associated arrows so as to be positioned in the path of one or more of the flow portions D, E, and F at a desired angle for deflecting, redirecting, damping or combining one or more of the flow portions or a portion thereof, to achieve a desired crop residue distribution over a field.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a crop residue spreader including an element disposed in a housing and rotatable in a predetermined direction about an axis for driving a flow of crop residue through a discharge opening of the housing located at a predetermined angular position around the axis, an improvement comprising:

a flow guide including at least two tiers having inlet ends disposed in at least generally axially side by side relation adjacent to the discharge opening in position for directing portions of the flow of crop residue in generally the predetermined direction radially outwardly and away from the opening, respectively, each of the tiers having a curved surface connected to the inlet end thereof and extending generally in the predetermined direction radially outwardly and away from the discharge opening to a discharge end spaced radially outwardly from the spreader for directing the respective portion of the flow of the crop residue radially outwardly away from the spreader, the curved surfaces and discharge ends of the tiers being vertically offset one relative to the other such that the portions of the flow of the crop residue will follow vertically different flow paths away from the spreader, further comprising an element pivotally connecting the flow guide to the spreader for pivotal movement about a pivotal axis at least generally parallel to the axis of the spreader to allow moving the discharge ends of the tiers through a range of positions different radial distances from the axis of the spreader.

2. In the crop residue spreader of claim 1, the improvement further comprising the tiers being integrally formed and having a stepped cross sectional shape when viewed from one of the ends.

3. In the crop residue spreader of claim 1, the improvement further comprising the inlet ends of the tiers being radially coextensive relative to the axis.

4. In the crop residue spreader of claim 1, the improvement further comprising at least three of the tiers such that the portions of the flow of the crop residue away from the spreader will follow three flow paths, respectively.

5. In the crop residue spreader of claim 1, the improvement comprising at least one deflector panel disposed along the flow paths for further directing the flow of crop residue.

6. A flow guide for a rotary crop residue spreader, the spreader including an element disposed in a housing and rotatable in a predetermined direction therein about a rotational axis oriented horizontally or at a small acute angle to horizontal for generating a flow of crop residue in the predetermined rotational direction along a generally circumferential flow path within the housing for discharge therefrom through a radially facing opening thereof located at a predetermined position around the axis, the flow guide comprising:

a first end disposed adjacent to the discharge opening in generally tangential relation to the circumferential flow path, and a plurality of flow surfaces extending in the predetermined rotational direction radially outwardly from the first end, the flow surfaces being progressively offset in the vertical direction one relative to the other for directing the flow of the crop residue therealong radially outwardly from the spreader along a corresponding plurality of vertically different flow paths.

7. The flow guide of claim 6, wherein adjacent ones of the flow surfaces are offset in vertically stepped relation one to the other.

8. The flow guide of claim 6, wherein the flow surfaces are integrally formed and each have a discharge end opposite the first end, the discharge ends having a stepped cross sectional shape.

9. The flow guide of claim 6, further comprising at least one deflector panel disposed along the flow paths for further directing the flow of crop residue.

10. The flow guide of claim 6, further comprising an element pivotally connecting the flow guide to the spreader for pivotal movement about a pivotal axis at least generally parallel to the rotational axis to allow moving the flow guide through a range of positions different radial distances from the rotational axis.

11. A rotary crop residue spreader for an agricultural combine, comprising:

a housing mountable to the combine in position for receiving crop residue from a threshing mechanism thereof and containing an element disposed for rotation in a predetermined direction therein about a rotational axis oriented horizontally or at a small acute angle to horizontal for generating a rotary flow of the crop residue in the predetermined rotational direction along a circumferential flow path within the housing for discharge therefrom through a radially facing outlet through the housing located at a predetermined position around the axis; and a flow guide having a first end disposed adjacent to the outlet in generally tangential relation to the circumferential flow path, and a plurality of flow tiers extending in the predetermined rotational direction radially outwardly from the first end, the flow tiers being progressively offset in the vertical direction one relative to the other for directing the flow of the crop residue therealong radially outwardly from the housing along a corresponding plurality of vertically different flow paths, respectively.

12. The rotary crop residue spreader of claim 11, wherein the flow guide is hingedly connected to the housing for movement radially inwardly and outwardly relative thereto.

* * * * *